April 2, 1935.　　　　E. A. ROCKWELL　　　　1,996,590
FUEL FEEDING APPARATUS
Filed Nov. 25, 1929　　　9 Sheets-Sheet 1

Inventor:
Edward A. Rockwell,

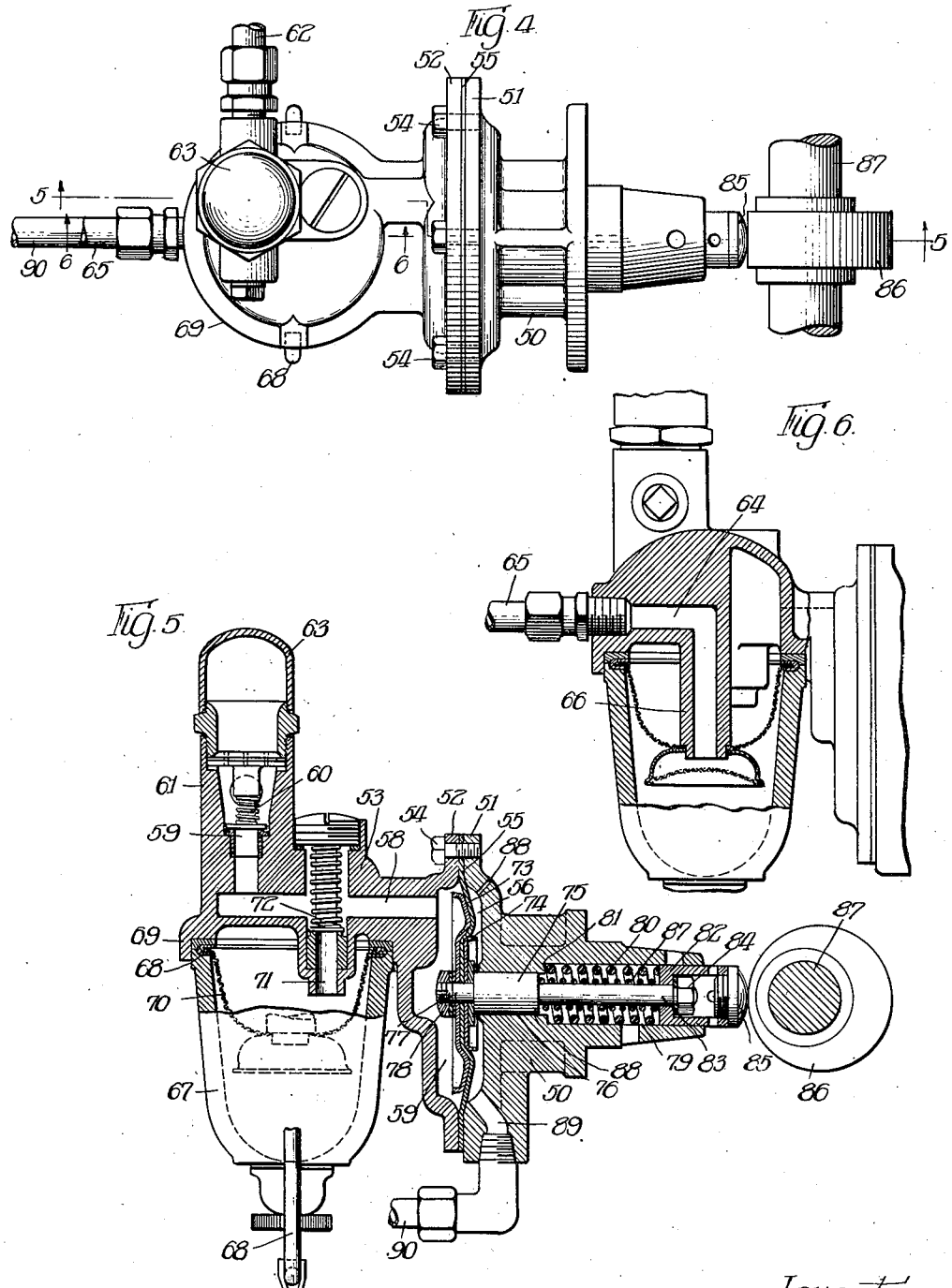

April 2, 1935.  E. A. ROCKWELL  1,996,590
FUEL FEEDING APPARATUS
Filed Nov. 25, 1929  9 Sheets-Sheet 3
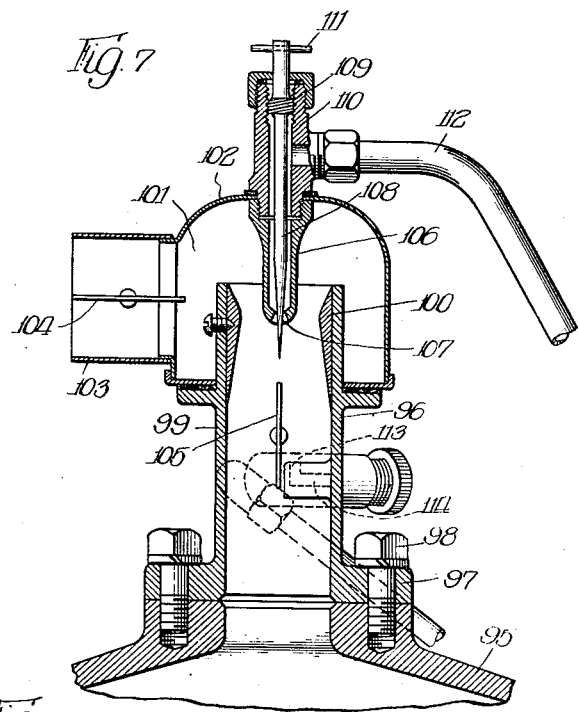
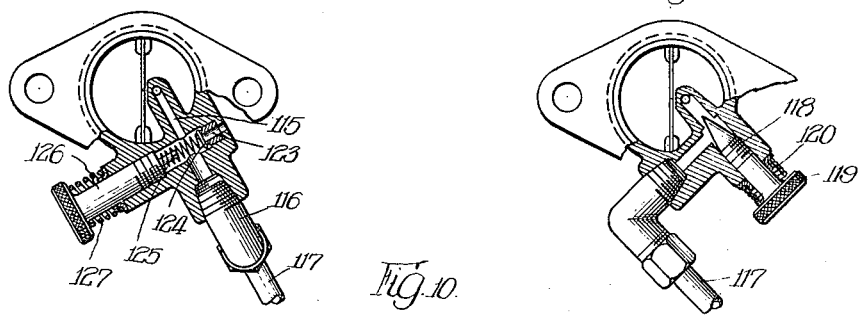
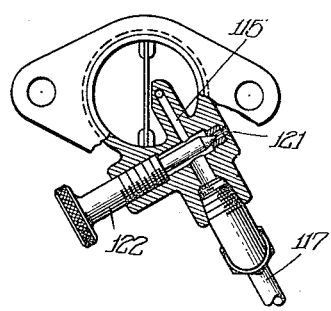
Inventor
Edward A. Rockwell April 2, 1935.  E. A. ROCKWELL  1,996,590
FUEL FEEDING APPARATUS
Filed Nov. 25, 1929  9 Sheets-Sheet 4
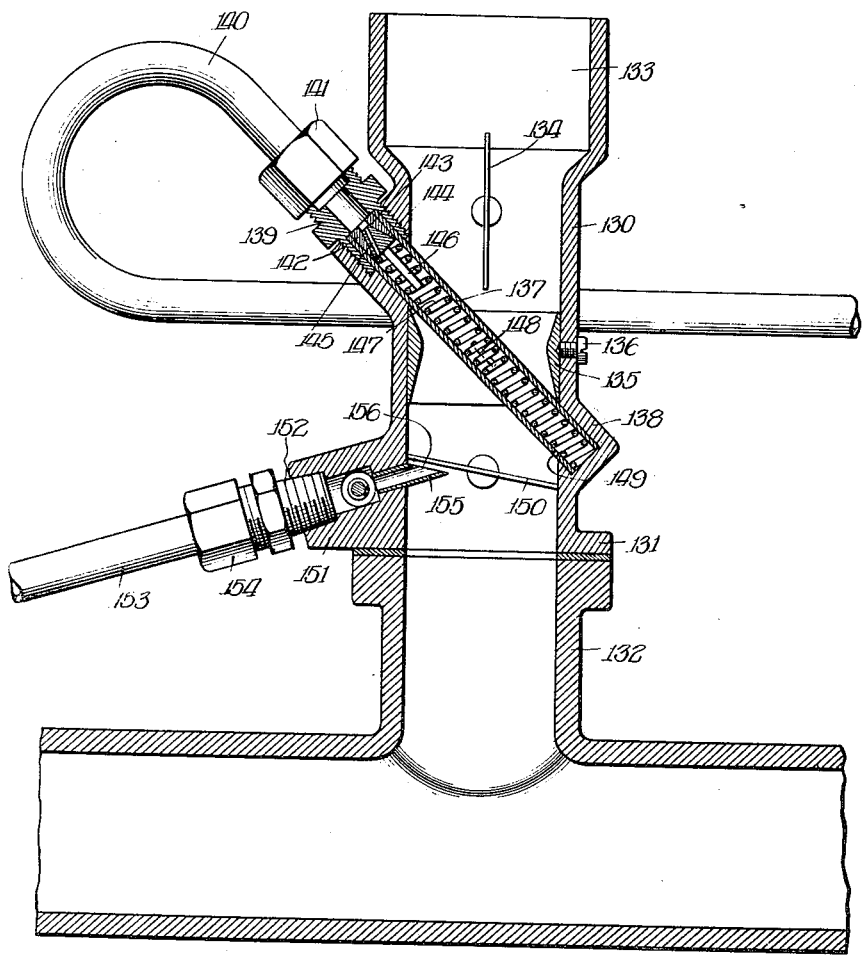
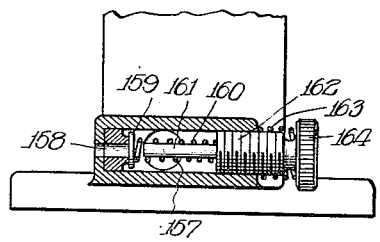
Inventor:
Edward A. Rockwell, April 2, 1935. E. A. ROCKWELL 1,996,590
FUEL FEEDING APPARATUS
Filed Nov. 25, 1929 9 Sheets-Sheet 5
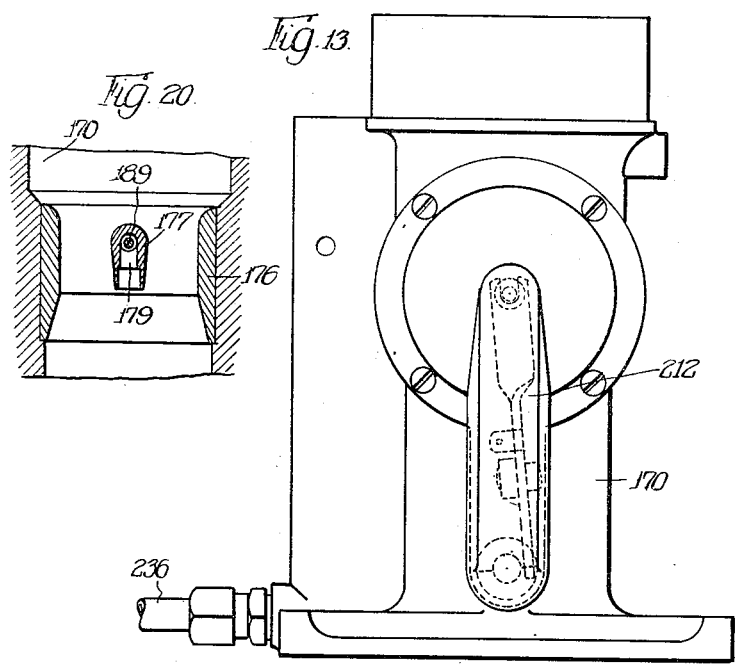
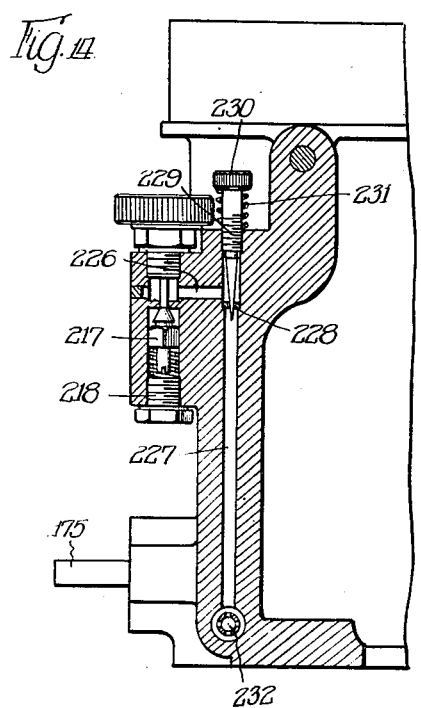
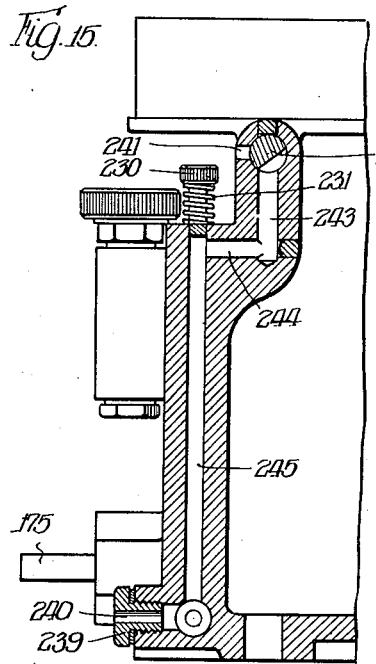
Inventor:
Edward A. Rockwell, April 2, 1935.  E. A. ROCKWELL  1,996,590
FUEL FEEDING APPARATUS
Filed Nov. 25, 1929   9 Sheets-Sheet 6
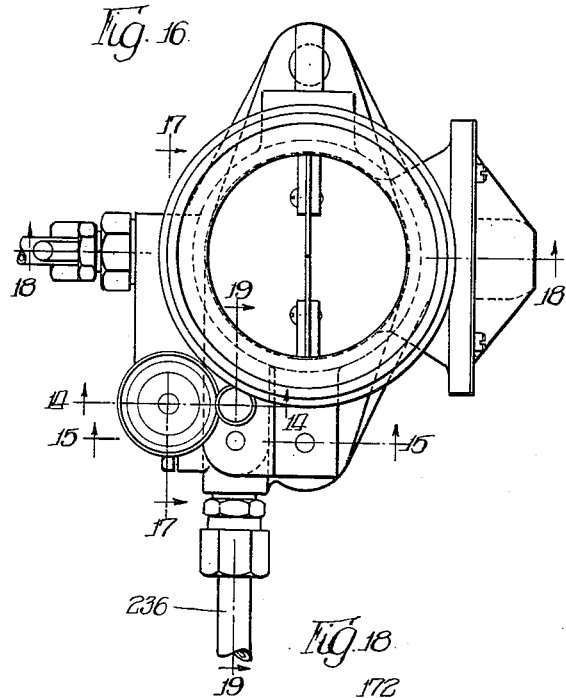
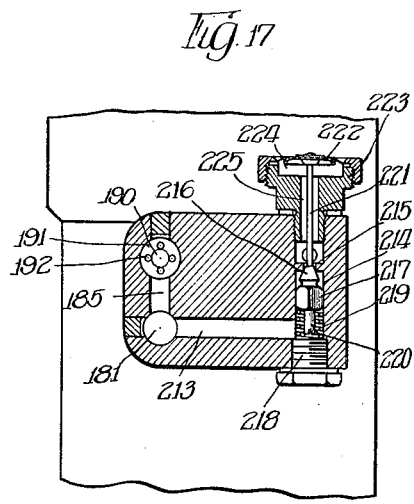
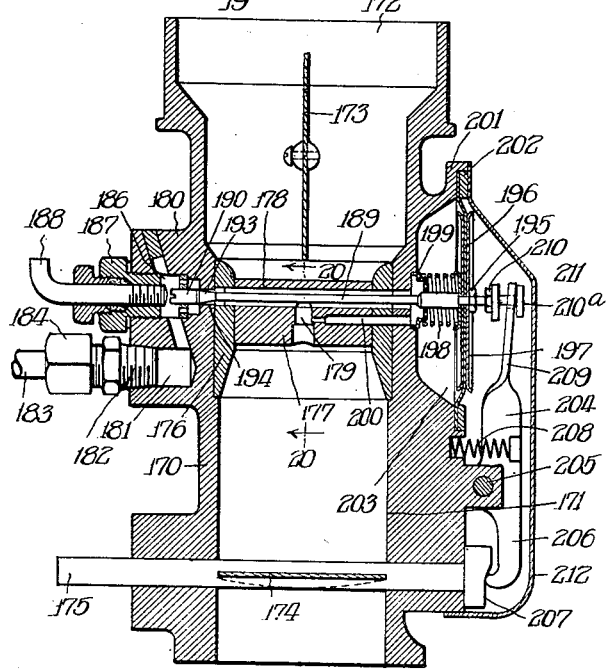
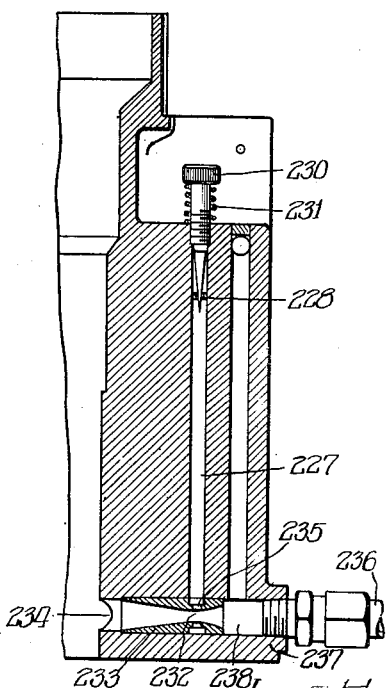
Inventor:
Edward A. Rockwell,

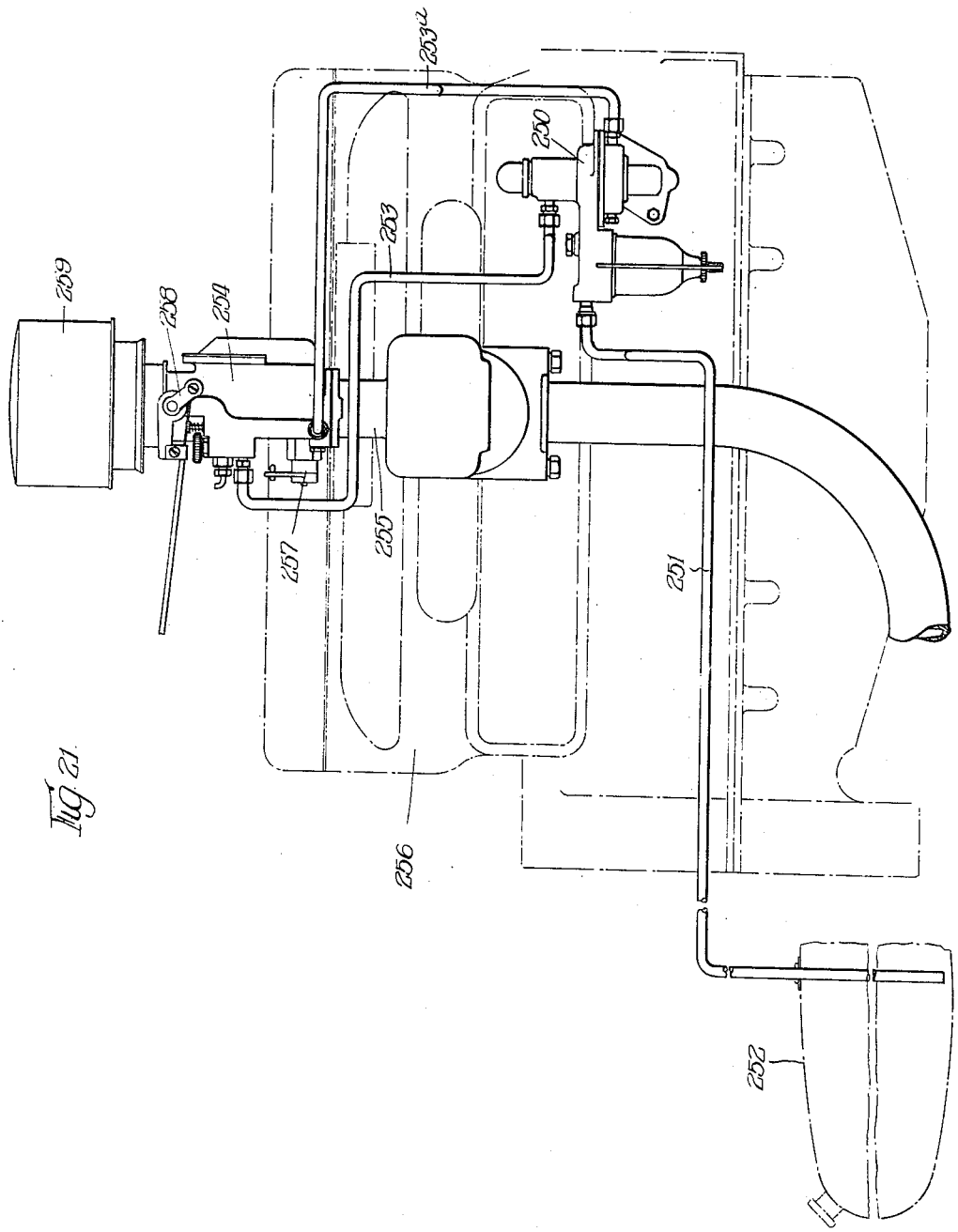

April 2, 1935.   E. A. ROCKWELL   1,996,590
FUEL FEEDING APPARATUS
Filed Nov. 25, 1929    9 Sheets-Sheet 8
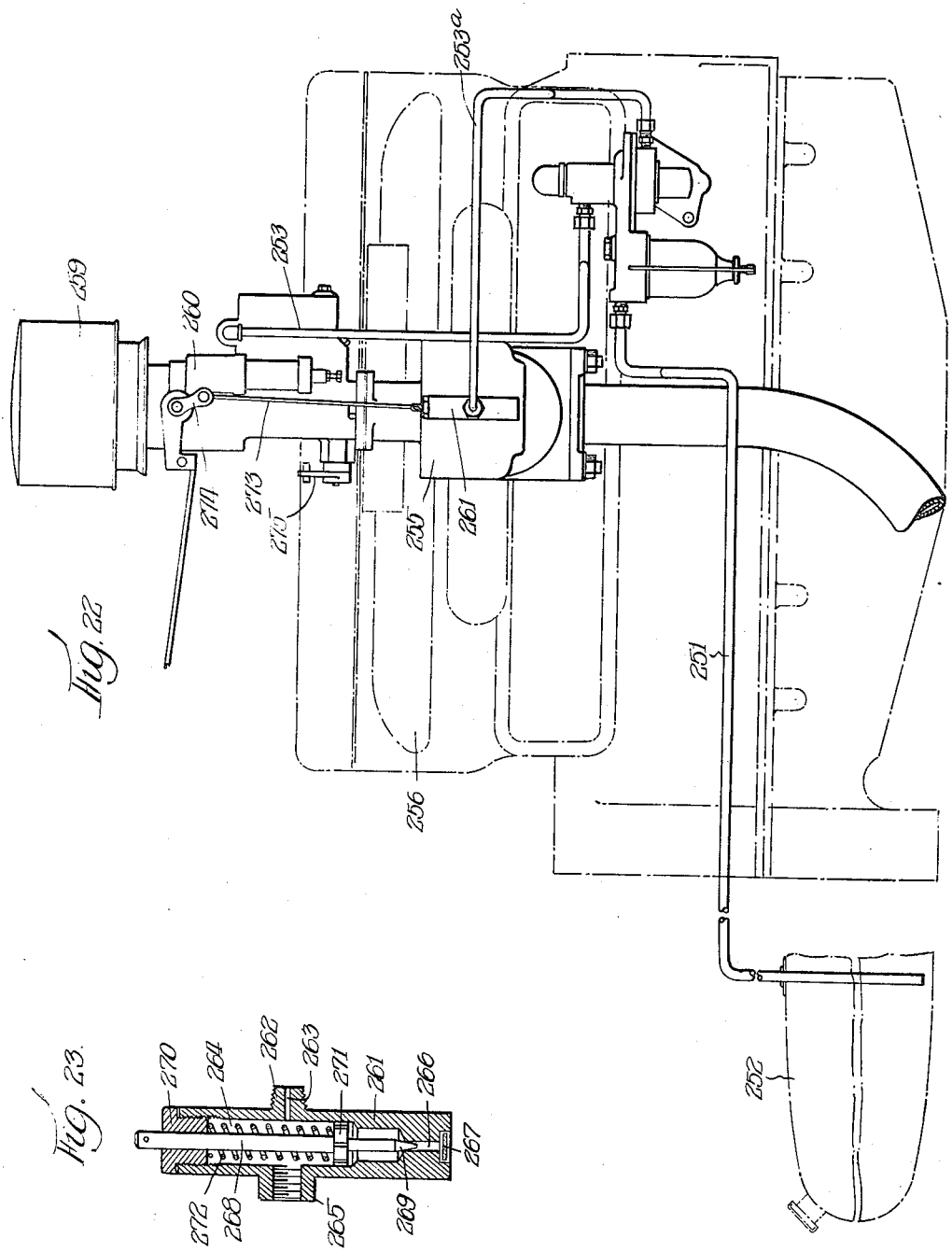
Inventor
Edward A. Rockwell,

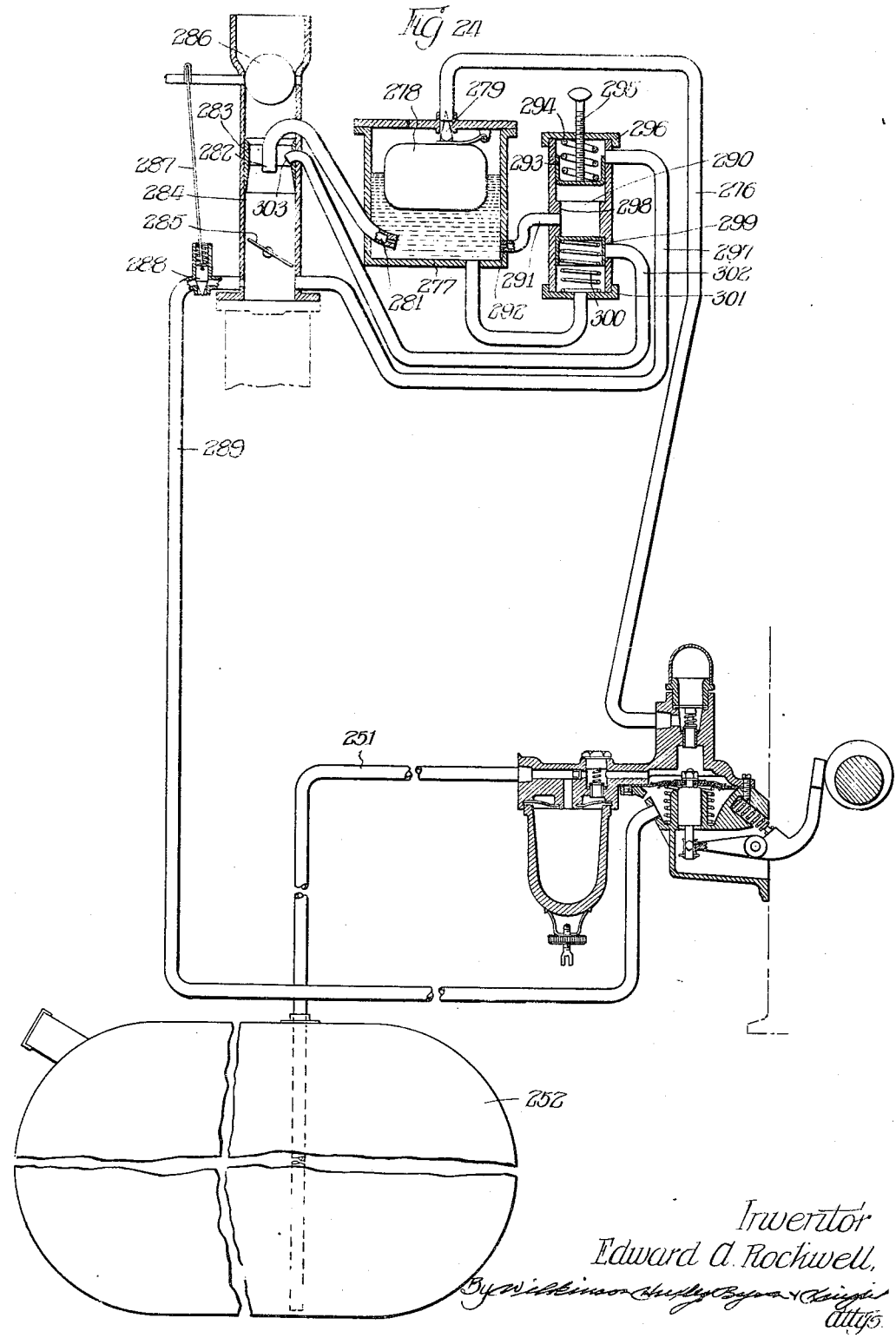

Patented Apr. 2, 1935

1,996,590

UNITED STATES PATENT OFFICE 1,996,590

FUEL FEEDING APPARATUS

Edward A. Rockwell, Chicago, Ill.

Application November 25, 1929, Serial No. 409,538

38 Claims. (Cl. 123—139)

The present invention consists in improvements in fuel feeding apparatus and especially in improved means for controlling the delivery of fuel feeding means adapted to be associated with an internal combustion engine.

This invention has been developed to improve upon the apparatus hitherto used for feeding a fuel mixture to an internal combustion engine. At the start the problems in carburetion were well recognized. It is desirable that the ratio of fuel to air for all conditions of load upon the engine should be in correct proportions to obtain efficient explosive mixtures. Therefore as the speed of an engine increases it is necessary to increase the flow both of air and of fuel. For certain conditions a rich mixture is preferable such as starting a cold engine or for rapid accelerations in speed. In a simple form of carburetor the fuel nozzle to which the fuel is delivered is placed in the mixture chamber so that the air stream flowing by the nozzle will pick up the fuel from the nozzle. The feed to the nozzle is usually from a float chamber. With such a system it has been proven that an increase in speed of the engine will tend to richen the mixture since the ratio between the fuel feed at low speed and the fuel feed at high speed will be greater than the ratio of the feed of air supplied at low speed and the feed of air supplied at high speed. In order to maintain a constant ratio it has been suggested that the fuel be fed to the nozzle at a constant head which will be sufficient to compensate for the normally increasing rich mixture.

Several methods have been used to feed fuel from the tank to the float chamber of the carbureter. Thus it has been customary to produce a pressure in the fuel tank which will be sufficient to feed the fuel to the float chamber. Also vacuum tanks have been used in which the suction in the intake manifold serves to lift the fuel to the vacuum tank from which it is fed by gravity to the carbureter. Recently fuel pumps have been developed which will act to lift the fuel from the tank and feed it to the carbureters. The fuel pumps as preferably designed include a pulsating diaphragm or movable wall member which is in communication with a pump chamber having passages extending to the feed pipe and delivery pipe. Check valves are provided in each of the feed and delivery passages from the pump chamber in order to prevent backward flow of fuel. The pump is arranged to be operated from the engine cam shaft whereby the pulsations of the pump will increase relative to the speed of the engine, but the effective stroke decreases as the speed of the engine increases. The diaphragm is not given a positive feed stroke but the feed is controlled by a suitable spring which provides a predetermined impulse. Such a pump will give a substantially constant delivery at a constant pressure during ordinary running speeds. If the pump feeds to a carbureter having an inlet valve controlled by a float the closing of the inlet valve of the carbureter will tend to transmit a back pressure to the pump diaphragm which opposes the force of the feed spring and prevents movement of the diaphragm. The member which is moved by the action of the cam shaft to allow the pump to feed has a lost motion connection to the diaphragm and may be so arranged that a positive intake stroke is given to the diaphragm or a compression spring may also serve to effect the intake stroke. In either case the pump will shut off through the action of the back pressure while the cam shaft continues to rotate and the actuating member is moved. The side of the diaphragm opposite to that in communication with the fuel chamber is open to atmosphere. The control of the fuel pump delivery by a float operating a check valve is subject to practical objections. The shut-off pressure is determined by the strength of the feed spring while the feed spring determines the maximum delivery. As the shut-off pressure increases there is a wider variation between the high and low levels in the float chamber and there is danger of spill over into the intake manifold when the engine stops.

Furthermore fuel pumps are not efficient in delivering fuel for an accelerating mixture. For example, when the throttle is suddenly snapped open in order to increase the speed of the engine the delivery of the pump is not immediately modified and the fuel drawn from the float chamber only increases relative to the Venturi depression. Therefore it is necessary to provide means associated with the carbureter to inject the desired rich mixture for acceleration.

It is broadly the purpose of the present invention to eliminate the float chamber by delivering fuel from a fuel pump of a type such as described above, which has a pre-determined impulse stroke to a delivery orifice of the carbureter which may be either of the updraft or downdraft type. With such a system it is obvious that the depressions in the carbureter intake such as for example in the Venturi throat will tend to regulate and control the delivery of fuel by the pump without the use of any controlling valve. Thus, when the throttle is closed the depression in the Venturi throat will be sufficient to allow the desired idle flow of fuel to the carbureter and as the throttle is opened the depression increases and the delivery of fuel is increased since by reducing the effective head at which the pump delivers the effective force of the feed spring is increased.

It is further a purpose of the present invention to control the delivery of a fuel pump by subjecting the back side of the pump diaphragm to depressions which will oppose the force of the feed spring and tend to cut down the delivery as the back side pressure is lowered. Thus, the back of the pump instead of being provided with a wide opening to allow atmospheric pressure to act at all times is provided with a restricted breather opening and a depression is produced by sucking air from the chamber in such a manner that the effective movement of the pumping member is cut down.

It is an object of the invention to have the depressions which act on the back side of the pump diaphragm correspond proportionately to the depressions in the intake manifold on the engine side of the throttle, since thereby the delivery of fuel by the pump will correspond to the engine demand. Thus, when the throttle is closed a high depression will be communicated to the back side of the pump diaphragm and only permit an idling delivery flow. While, as the throttle is opened the back side of the pump will approach atmospheric pressure and permit the maximum delivery. This means of control constitutes an important advantage in that a stronger feed spring may be utilized than with the ordinary type of fuel pump. It will be obvious that the pump will immediately deliver its maximum flow for purposes of acceleration when the throttle is suddenly snapped open. Furthermore, since the pump delivers directly to the throat of the carbureter the fuel may be supplied at a pressure head sufficient to compensate for the normally increasing rich mixture as the speed of the engine increases.

Therefore, according to the present improvements, the fuel pump will perform its normal function of feeding fuel from the supply tank to the carbureter; will take the place of the customary float chamber; will serve as compensating means for maintaining a constant ratio between the fuel and air feed at all engine speeds; will provide means for delivering an accelerating mixture and will in general take the place of complicated devices previously used for controlling the delivery of fuel.

It is also an object of the invention to control the pump through means of a tube which connects between the intake manifold of the engine beyond the throttle and the back side of the pump diaphragm and to adjust the flow of air through the tube by suitable bleed openings to obtain desired results.

It is further an object of the invention to control the pump by the position of the choke valve. Thus, the choke valve may be arranged to control a bleed opening into the pump control tube, in such a manner, that with the choke in closed position, air at atmospheric pressure will be allowed to flow into the controlling tube and therefore allow the pump to give an increased delivery to provide a rich mixture for starting purposes. The construction is such that the tendency to overchoke as the engine speeds up is prevented.

Further and additional objects and advantages of the present improvements and detailed features of construction will be more readily apparent as the invention is fully described in connection with the attached drawings in which various modified embodiments are illustrated.

In the drawings:

Figure 4 is a top plan view of a vertical diaphragm fuel pump;

Figure 5 is a vertical section taken on the plane indicated by 5—5 in Figure 4;

Figure 6 is a partial vertical section taken on the plane indicated by 6—6 in Figure 4;

Figure 7 is a vertical section of a simple form of downdraft carbureter having a load controlling connection to a fuel pump;

Figure 8 is a detail horizontal section taken through the load control tube connection, illustrating a pressure controlled bleed valve;

Figure 9 is a partial horizontal detail section similar to Figure 8 of a modified form illustrating an adjustable needle valve for controlling the flow of air through the tube;

Figure 10 is a further modification similar to Figure 8 illustrating an adjustable needle for controlling a bleed valve;

Figure 11 is a vertical section taken through a modified construction of a downdraft carburetor having improved means for delivering fuel into the carbureter throat;

Figure 12 is a detail section of the pressure controlled bleed valve shown in Figure 11;

Figure 13 is a side elevation of a further modification of a downdraft carbureter having various improvements in construction;

Figure 14 is a vertical section taken on the plane indicated by 14—14 in Figure 16;

Figure 15 is a vertical section taken on the plane indicated by 15—15 in Figure 16 parallel to that of Figure 14;

Figure 16 is a top plan view of the carbureter shown in Figure 13;

Figure 17 is a detail section taken on the plane indicated by 17—17 in Figure 16;

Figure 18 is a vertical section taken through the axis of the carbureter on the plane indicated by 18—18 in Figure 16;

Figure 19 is a vertical section taken on the plane indicated by 19—19 in Figure 16;

Figure 20 is a detail vertical section taken through the venturi and feeding strut on the plane indicated by 20—20 in Figure 18;

Figure 21 is a somewhat diagrammatic elevation illustrating a carbureter such as shown in Figures 15 to 20 in association with a fuel pump and an internal combustion engine;

Figure 22 is a diagrammatic elevation similar to Figure 21 showing a modified form of carbureter;

Figure 23 is a detail section taken through the connection between the load controlling tube and the intake manifold as in Figure 22; and Figure 24 is a diagrammatic view partially in section illustrating the elements of a carbureter such as shown in Figure 22 in association with a horizontal diaphragm pump similar to that shown in Figures 1 to 3 inclusive.

Figure 1:
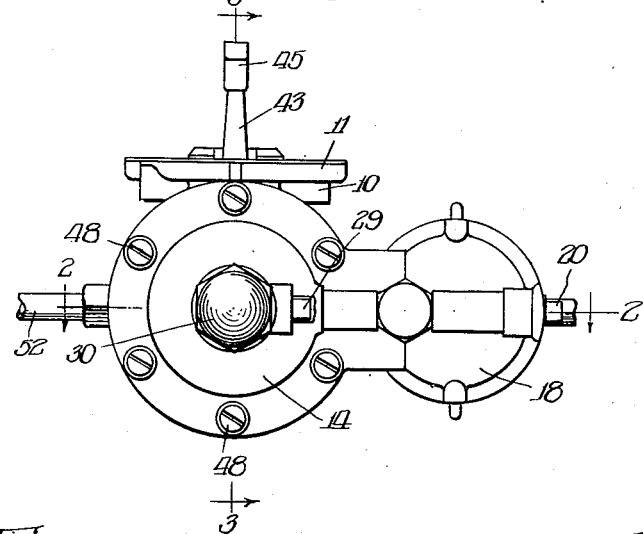
Figure 1 is a top plan view of a horizontal diaphragm fuel pump.

One broad aspect of the present invention consists in controlling the action of a limited impulse pump which may be of a type having a movable diaphragm which is allowed to be moved for the feed stroke, through the force of an interposed spring, by the movement of an arm having a lost motion connection with the diaphragm, the arm being actuated through a suitable cam carried by a rotating shaft. Fuel feed pumps of this general type have been developed and are commonly used in place of the vacuum tank in automobiles to deliver fuel to the float chamber of a carburetor after lifting the fuel from a source of supply.

The construction generally includes a variable capacity pump chamber, a wall of which chamber constitutes the movable pumping member. The inlet and outlet ducts from the pump chamber are controlled by check valves to prevent return flow of the fuel. The side of the diaphragm opposite to that in association with the fuel is generally covered by a housing member which has a vent to admit atmosphere to the back side of the pump diaphragm. In one form of pump the diaphragm is forcibly moved for its intake suction stroke through the action of the cam on the movable actuating arm. The return movement of the arm through the action of a spring which urges it to follow the cam allows the feed spring which has been compressed during the intake stroke to expand and move the diaphragm to force the fuel through the exit check valve. In the second form of pump, the intake stroke is regulated through the force of a spring as well as the feed stroke. No fuel will be fed when the engine is not operating. The pump will increase its delivery as the engine speed increases and will reach a maximum delivery that is maintained substantially constant during normal running speeds. The pulsations vary directly with the engine speed but the effective stroke of each pulsation is cut down as the speed of the engine increases since the feed spring is not given time to expand its full amount. The pressure head on the delivery side of the pump will control the delivery. Thus a back pressure on the pump will, if sufficient, prevent the movement of the pumping diaphragm by compensating for the force of the feed spring. The feed stroke of the pump can never be stronger than the force of the feed spring and in the usual arrangement the pump delivers to a float chamber in which the movement of the float will close the inlet valve to the float chamber. A stronger feed springs results in a higher shut-off pressure and makes for a wider variation in the float chamber level and may cause flooding and spilling over from the float chamber. According to my invention the pressure on the back side of the diaphragm is regulated in order to vary the action of the pump. Thus the application of a sub-atmospheric pressure to the back side of the pump diaphragm will compensate for the force of the feed spring in the same manner as a back pressure applied to the delivery side of the pump. In this manner by applying a high suction to the back of the pump diaphragm the pump may be prevented from operating at a very low shut-off pressure. This has important advantages when the pump is used with carbureters having a float chamber, but as my description of the invention proceeds it will be understood that according to a preferred arrangement the float chamber may be eliminated entirely. Another advantage of controlling the pump by varying pressure conditions from the back side of the pump is that a stronger feed spring may be used in order to give an increased delivery under certain conditions. In the drawings to be described, reference will be made to a pressure tube communicating with the back side of the pump diaphragm as a "load" control tube. It will be understood that the variation of pressures may be secured in any desirable manner but according to the present disclosure the pressure conditions in the intake manifold beyond the throttle are utilized to control the pressure of the back side of the pump diaphragm. Therefore the pump is responsive to variations of engine load.

Figure 2:
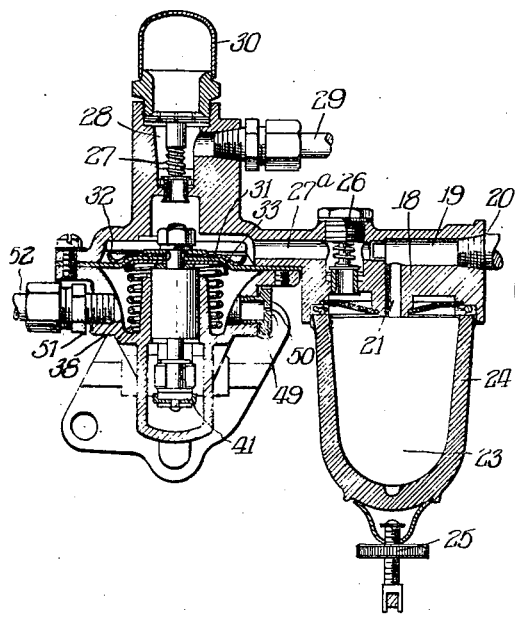
Figure 2 is a vertical section taken on the plane indicated by 2—2 in Figure 1.
Figure 3:
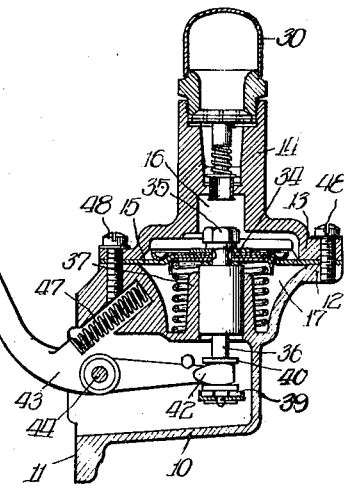
Figure 3 is a vertical section taken transverse to the section of Figure 2 on the plane indicated by 3—3 in Figure 1 and illustrating the association of the pump with a cam shaft.

Figures 1, 2 and 3 illustrate one form of load controlled resilient impulse pump while Figures 4, 5 and 6 illustrate a second form. The specific construction of the pump is not important and forms no part of the present invention, except in the use of the load control tube and a restricted breather opening, but in order that the principles of such types of pumps may be readily understood, I shall describe commercial forms of fuel pumps.

The pumping apparatus in Figures 1, 2 and 3 consists of a pair of detachably associated castings, the lower or base casting 10 being designed with a flange 11 which seats against, and is intended to be secured to, the frame of the engine. The casting 10 has a flange 12 in a horizontal plane, corresponding to an annular flange 13 of the upper casting 14. Clamped between the flanges 12 and 13 of the pair of separable castings, is the edge of a circular flexible diaphragm 15 which partitions the chamber formed between the pair of castings into an upper pumping chamber 16 and a lower normally atmospheric chamber 17. A lateral extension 18 is cast with the upper casting 14 and has formed therein an inlet passage 19 which communicates with the inlet tube 20. The passage 19 extends downwardly as at 21 into a visible filter chamber 23 which is formed by a suitable transparent cup 24 detachably held to the extension casting 18 such as by the holding means partially shown at 25. The exit from the chamber 23 is through a screen and a check valve 26 which is an ordinary valve held to its seat by the force of a spring to prevent return flow during the feeding stroke of the pump. The spring controlling the inlet check valve is sufficiently strong to prevent opening of the valve should the level of the supply be above the fuel pump and the valve is only opened by a suction stroke of the pump. The check valve 26 communicates with a passage 27a leading into the pump chamber 16. The exit from the pump chamber is through a check valve 27 mounted in the upwardly extending passage way 28 which communicates with the delivery tube 29. A vapor dome 30 is provided at the upper end of the passage 28 in order to maintain a uniform delivery of the pump and to prevent fluctuations. The diaphragm 15 is held between a disc member having an annular recess 32 in its edge and a lower spring cap 33. A washer 34 is mounted on top of the disc member 31 and the parts are clamped together through means of the nut 35 against a shoulder of a plunger 36. A cylindrical portion 37 is formed with the lower casting 10 to guide the movement of the reciprocable plunger 36. Around the portion 37 is seated a coiled feed spring 38 which engages at its upper end the spring cap 33. The spring 38 normally urges the pump diaphragm to its upper position. At the lower reduced end of the plunger 36 is secured an abutment stop 41 immediately above which is mounted a freely slidable spool 40. A leather seat 39 is held by the abutment stop 41 to cushion the downward movement of the plunger 36. The spool 40 is engaged by a yoke portion 42 of a bell crank lever 43 mounted on a pivot 44 secured in the casting 10. The lever 43 has a thrust arm 45 normally urged to follow an eccentric cam 46 by a spring 47 which is received in a hollowed portion of the casting 10. The castings 10 and 14 are connected by the screw bolts 48. The lower casting 10 which forms the atmospheric chamber 17 has threaded into one side thereof a plug 49 having a restricted bleed opening 50. At the opposite side of the casting 10 and communicating with the chamber 17 is provided a threaded plug 51 to which may be attached a pressure communicating tube 52 which constitutes the load control tube. It will be apparent that a rotation of the eccentric cam 46 will allow the bell crank 43 to be rotated in a counterclockwise direction about the pivot, thus moving the spool 40 upward relative to the plunger 36. This movement will permit the spring 38 to expend its energy by moving the diaphragm upward for its feeding stroke, and thus fuel will be delivered through the exit valve 27. Further rotation of the cam 46 will again lift the bell crank to the position shown and this movement in a clockwise direction will pull down the plunger 36 together with the diaphragm for the intake stroke of the pump. It will be apparent that a depression communicated to the chamber 17 through the load control tube 52 will tend to decrease the effective force of the spring 38. Thus the pump will have its maximum delivery when the chamber 17 is at atmospheric pressure and will shut off when the pressure on the delivery side of the pump balances the effective force of the feed spring 38 determined by the strength of the spring, minus the depression existing in the chamber 17.

The delivery of fuel from the pump will therefore be controlled by the pressure conditions produced in the controlling tube which leads to the back side of the diaphragm. According to the preferred manner of controlling the pump, as will be later described, the pressure conditions are produced by a communication of the controlling tube with the intake manifold of the engine at a point on the engine side of the throttle. In order to regulate the action of the controlling tube, it is desirable that an air bleed be utilized such as the removable plug 49 with the orifice or breather opening 50. The air bleed will permit the correct delivery of fuel under idle conditions.

A pump of another form to which the present improvements are applicable is illustrated in Figures 4, 5 and 6. The distinctions of this form of pump comprise the elimination of the pivoted lever utilized in the first form of pump and the arrangement of a pair of springs whereby both the feed and suction strokes are resiliently obtained. The diaphragm in such case is arranged in a vertical position. The construction comprises a casting 50 having a flanged edge 51 held to the flange 52 of a second casting 53, by means of the screw bolts 54. A resilient diaphragm 55 is held by its circular edge between the meeting flanges of the pair of castings. The casting 50 is suitably recessed to form a chamber 56 on the back side of the diaphragm while the casting 53 is similarly recessed to form a chamber 57 constituting the fluid chamber. The chamber 57 is in communication through a port 58 formed in the casting 53 with a delivery passage 59 controlled by the spring pressed check valve 60. The passage 59 is formed in an upwardly extending tubular extension 61 which has extending therefrom the delivery tube 62. The upper end of the extension 61 is closed by the removable cap 63 which forms a vapor dome to maintain a uniform delivery. An inlet passage 64 is formed in the casting 53 and is in communication with the suction line 65 which extends from a source of fluid supply. The passage 64 extends downwardly through the tube 66 and delivers to the bottom of the visible filter chamber 67 which is detachably held to the bottom casting 53 by the securing means 68. The chamber 67 comprises a transparent bowl having a flanged upper edge fitting into a recessed seat 69 of the casting 53 and serving to retain a filter screen 70. The bowl 67 therefore constitutes a sediment trap and will filter out impurities in the fluid. The delivery from the bowl 67 is through an outlet passage 71 controlled by the spring pressed check valve 72. The opening of the check valve 72 will admit fluid to the passage 58 communicating with the pump chamber 59.

The mounting of the diaphragm is similar to that of the first form of pump and comprises a disc 73 on one side of the diaphragm and a disc 74 on the other side of the diaphragm. A reciprocal plunger 75 includes an enlarged portion slidable within cylindrical guide portion 76 of the casting 50 and is formed at its left-hand end with a reduced stud 77 extending through the retaining discs for the diaphragm and is held by the nut 78. The right-hand portion of the casting 51 includes an enlarged cylindrical opening 79 to receive a coiled suction intake spring 80 which fits at its left hand end against a shoulder 81 of the casting 50 and engages at its opposite end the operating member 82. The reciprocal member 75 includes a rod 83 which extends through the suction spring 80 and into an opening formed in the operating member 82 and held by the nut 84. The end of the member 82 is closed by the contact button 85 maintained in thrust engagement with the rotating eccentric cam 86 mounted on the shaft 87. Mounted within the intake spring 80 and surrounding the rod 79 is the feed spring 87. The spring 87 presses at one end against a shoulder 88 of the reciprocal member 75 and at its opposite end against the slidable actuating member 82.

Thus it will be apparent that a rotation of the cam 86 from the position shown will urge the actuating member 82 to the left, compressing both of the springs 80 and 87. The diaphragm will not be positively moved but the movement of the member 82 will permit the inner feed spring 87 to urge the nut 84 to follow the member 82 and cause the diaphragm to be moved for its delivery stroke. The fluid in the chamber 57 will therefore be forced through the outlet check valve 60 and into the delivery tube. Continued movement of the cam 86 will permit the intake spring 80, which has been compressed, to force the contact button 85 to follow the cam 86 and move the diaphragm for its intake stroke. During this movement the fluid will be sucked in through the inlet check valve 72 and fill the pump chamber. Thus both strokes of the pump will be effectuated by the action of the springs. The casting 50 is formed with a restricted bleed opening 88 which admits air at atmospheric pressure to the back side of the pump diaphragm. The chamber 56 is also in communication with a port 89 to which is attached a controlling tube 90. A variation in the pressure conditions communicated through the tube 90 will control the action of the pump in a similar manner to that previously described with reference to the first form of pump. In both forms of pump a much stronger feed spring may be utilized since a depression communicated through the controlling tubes will oppose the action of the feed spring and cut down the movement of the diaphragm.

As illustrative of the association of the fuel pump with a carbureter, Figures 7 to 10 inclusive show a simple form of downdraft carbureter. It may be readily understood that the fuel pump may deliver directly to either an updraft or downdraft carbureter, but the downdraft carbureter gives an increased volumetric efficiency. In these figures 95 is a portion of an intake manifold having mounted thereon the carbureter designated generally 96 secured by its flange 97 through screw bols 98. The carbureter comprises a vertical tube 99 having at its upper end a Venturi section 100 and in communication with an air conduit 101 formed by the chamber 102. A tube 103 leads into the chamber 102 to deliver air thereto and has positioned therein a choke valve 104. A throttle valve 105 is positioned in the tube 99 below the Venturi section. A fuel nozzle 106 extends downwardly to terminate at the Venturi section and is provided with an orifice 107 controlled by a needle valve 108. The needle valve has a threaded portion 109 engaging the connection 110 whereby the rotation of the needle valve by the handle 111 will vary the effective size of the orifice 107. A fuel delivery tube 112 leading from the fuel pump communicates with the connection 110 to deliver fuel to the orifice 107. Immediately below the throttle valve is positioned an orifice 113 which in this case is in the form of a Pitot tube 114. The Pitot tube has its orifice turned upward towards the downward flow of the mixture. A duct 115 leads from the Pitot tube orifice and communicates with a connection 116 for a pressure tube 117. The pressure tube 117 communicates with the back side of the pump diaphragm in accordance with the previous description of the pump. In order to control the flow of air through the tube 117 a needle valve 118 may be provided, as in Figure 9. The valve 118 has a knurled head 119 and is threaded into the side of the tube 99. The valve 118 is held in adjusted position through the action of the spring 120. A further manner of controlling the flow of air through the tube 117 for part throttle and idle condition consists in the utilization of an air bleed 121 as illustrated in Figure 10, which leads into the duct 115. The air bleed orifice is controlled by an adjustable needle valve 122. It is sometimes desirable to provide an automatic adjustment of the correct idling mixture so that when the throttle is closed the high suction produced in the intake manifold will cause the opening of an air bleed and thus allow a slightly richer idling mixture. Figure 8 shows such a construction in which an air bleed 123 into the duct 115 is normally closed by the valve 124 through the strength of the spring 125. The spring 125 may be adjusted through movement of the plug 126 which is threaded into the side of the tube 99. The plug 126 is retained in adjusted position through a spring 127. With this form of adjustment it is apparent that the closing of the throttle will cause the opening of the valve 124 and bleed air into the tube 117 to permit the idling operation of the fuel pump and prevent having too lean a mixture at idle engine speeds.

Disregarding the action of the load control tube it will be apparent that a fuel pump delivering to a simple form of carbureter as in Figure 7 will have its delivery controlled by depressions at the venturi acting through the fuel nozzle to decrease the delivery head on the pump. Thus, the delivery of fuel by the pump will be increased as the air speed through the carbureter increases. The load control tube acts with an opposite effect since an increasing depression transmitted through the tube to the pump will tend to cut down the delivery of fuel.

When a fuel pump is arranged to deliver fuel from a source of supply directly to the throat of a carbureter the fuel pump will perform its normal function of feeding fuel from a source of supply. Also the fuel pump takes the place of any float chamber. A float chamber serves to maintain a supply of fuel at a constant level so that the flow of air through the throat of the carbureter will pick up fuel from the nozzle or delivery orifices. The float chamber will be unaffected by variations in the tank level or the head of the fuel supply. The spring which controls the inlet check valve of the fuel pump is so proportioned as to be sufficiently strong to resist opening due to any variation in the tank level and therefore fuel will be delivered to the fuel pump from the source of supply only during an intake stroke of the pump. The fuel pump will therefore be unaffected by variations in tank level and will serve to maintain a supply of fuel ready to be fed to the throat of the carbureter. A float chamber also serves to prevent feeding of fuel when the engine is stopped and the fuel pump will also perform this function since the inlet valve will not be opened by an intake pressure head except when the diaphragm is moved during the operation of the engine. The fuel pump also serves to compensate for the normally increasing rich mixture obtained when fuel is delivered to a carbureter throat through the action of the suction developed by the speed of the air through the carbureter. Thus, if a weak feed spring is used in the fuel pump the action of the engine suction acting through the load controlling tube will tend to give a mixture that is too lean at high speeds, whereas if a feed spring is utilized that is too strong the mixture will be rich at high speeds. The feed spring however, may be so proportioned that it will maintain the desired uniform ratio between the air and fuel feed to the carbureter throat. The fuel pump also serves to take the place of additional means of delivering an accelerating charge, since an opening of the throttle will immediately allow an increasing supply of fuel to be fed. Finally the fuel pump acts to automatically vary the delivery of fuel in accordance with the variation in the load conditions on the engine independent of any movement of the throttle. Thus the fuel supply of the engine is automatically controlled in a desirable manner by a substantially simple arrangement of operative elements.

As illustrative of a further development in the association of a load controlled pump with a down draft carbureter, having provision for feeding an idling mixture reference is directed to Figures 11 and 12. In this construction a carbureter body 130 comprises a vertical tube seating at its lower flange 131 on a portion of the intake manifold 132. The upper portion of the carbureter body 130 is provided with the air intake opening 133 and the air intake is controlled by movement of the choke valve 134. A Venturi section 135 is formed by a sleeve detachably held in the carbureter body by the screw 136. A diagonally disposed fuel feed tube 137 is arranged in the carbureter body seating at its lower end in the recessed portion 138. The tube is secured at its upper end by the threaded stud 139, which also forms a connection for the fuel feed line 140 held by the nut 141. A metering orifice plug 142 is held at the upper end of the tube 137 and is formed with a conical seat 143 on one side which engages a conical valve 144. The valve 144 has formed therein an idling metering orifice 145. Thus when the valve 144 is closed there may still be a flow of fuel through the orifice 145. The valve 144 has a pin 146 which prevents dislocation of the valve and the valve is maintained normally in closed position through the action of a coiled spring 147, which is held within the tube 137. High speed fuel slots 148 are formed at diametrical points of the tube 137 at the place where the tube crosses the narrowest portion of the Venturi section. A low speed orifice 149 is formed on the lower side of the tube 137 and at its lower end relatively close to the side wall of the carbureter body. A throttle valve 150 is mounted in the carbureter body to control the flow of the mixture and as shown is arranged to be opened by turning in a clockwise direction. Thus if the throttle is moved through a small angle for idling operation of the engine, the air passing the edge of the throttle will draw fuel from the idling orifice 149. If the throttle is moved to wide open position the high suction at the Venturi section will draw fuel from the main high speed jets of the fuel tube and will be communicated within the fuel tube to open the valve 144 against the action of the spring 147. Therefore a wide orifice is provided for feeding fuel at high speeds and full load operation. The carbureter of this design is also provided with a load controlling tube which is arranged in a manner similar to Figure 8 previously described. The carbureter body is formed with an extension 151 to which is attached the threaded connection 152 for attaching a load control tube 153 by means of the nut 154. A Pitot tube 155 extends through the wall of the carbureter body and has its orifice 156 turned upward towards the downward flow of the mixture. The passage 157 formed within the extension 151 of the carbureter body communicates with a bleed opening 158 which is normally closed by a valve 159 through the action of a spring 160. The spring 160 is associated with a pin 161 of an adjusting threaded plug 162. The plug 162 is maintained in adjusted position through means of the spring 163 which engages against a knurled head 164.

In this form of carbureter associated with a load controlled pump, at idling speeds, high suction in the intake manifold will cause the opening of the bleed orifice 158 and allow the pump to feed more fuel to give a slightly richer mixture which is desirable for idling purposes. The idling mixture is fed into the intake throat of the carbureter through the orifice 159 as previously described. When the engine is running at high speed with the throttle wide open the bleed opening 158 into the load controlling tube will be closed and the fuel will be delivered into the carbureter throat through the high speed slots 148, while the valve 144 will be held in open position.

Figures 13 to 20 inclusive illustrate an improved form of downdraft carbureter adapted to be associated with a load controlled fuel pump having automatic adjustment of the high speed and low speed jets and designed to feed the low speed idling mixture through an orifice which communicates with the load controlled tube in such a manner that an aspirated jet is obtained. Further this carbureter includes means for modifying the action of the load controlled tube through movement of the choke valve and other features which will be described in more detail.

I show a carbureter body 170 having an internal throat 171 adapted to be disposed in a vertical position in association with the intake manifold of an engine. The construction is therefore such that the air is sucked downward into the engine past the feed orifice for the fuel in such a manner as to suck in the fuel and form the carbureted mixture. An air intake 172 is shown at the upper end of the throat and is generally associated with an air cleaner. A choke valve 173 is positioned in the air intake controlling the flow of air. At the bottom of the carbureter body is disposed a throttle valve 174 mounted on a shaft 175 having an outer extension for purposes of manual control. In the middle portion of the carbureter throat is disposed a Venturi section 176. Across the mid portion of the Venturi section is disposed a strut 177 having a longitudinal fuel passage 178 formed therein communicating with a downwardly extending feeding orifice 179 arranged at the vertical axis of the carbureter. The strut 177 is formed in such a manner that it will not disturb the stream line flow through the carbureter throat.

As shown in the sectional Figure 18 a projection 180 is formed on the side of the carbureter body and has a chamber 181 formed therein which communicates with a threaded connection 182 adapted to be connected to a feed line 183 secured by nut 184. A fuel passage 185 upwardly extends from the chamber 181 and communicates with a chamber 186 which is closed by the threaded stud 187. The threaded stud 187 is adapted to receive an adjustable stop member 188 which limits the movement of a reciprocal valve controlling stem 189. The head 190 of the valve stem 189 is centered by and slides relative to a ring 191 having perforations 192 therethrough for the flow of the fuel. The valve stem 189 carries a conical valve 193 arranged as shown in Figure 18 to control the flow of fuel through an orifice 194 formed in the wall of the carbureter body and communicating with the passage 178 formed in the strut and Venturi section. It will be clearly apparent that movement of the valve stem 189 to the left into engagement with the adjustable stop 188 will open the valve to allow feeding of a regulated amount of the fuel. The right hand end of the stem 189 is attached through the nut 195 to a resilient diaphragm 196. The diaphragm 196 is mounted between a pair of disc members 197 while a coiled spring 198 continuously urges the diaphragm 196 to the right. The coiled spring seats at its left hand end against a spring cap 199, which seats against a wall of the carbureter body and covers the fuel passage 178. An additional fuel passage 200 is formed through the strut and Venturi section and wall of the carbureter body and communicates through a narrowed orifice with the feeding orifice 179. The passage 200 serves as a drain to maintain the fuel level which acts on the diaphragm below the opening of fuel passage 178. The circular edge of the resilient diaphragm is clamped against a flange 201 of the carbureter body, through means of the clamp ring 202. The spring cap 199 is perforated to allow the suction in the Venturi section to act in the chamber 203 which is enclosed by the diaphragm 196 and therefore the suction will tend to draw the diaphragm inward, compressing the spring and opening the fuel valve 193.

The position of the fuel valve 193 and the diaphragm is further modified through the action of a lever 204 which is pivotally carried by the stud 205 mounted in a projection of the carbureter body and includes a depending arm 206 having a toe in thrust engagement with a rotatable cam 207 formed on the end of the throttle shaft 175. The lever 204 is continuously urged to follow the cam through means of a spring 208 acting against the upwardly extending arm 209 of the lever. The stem 189 of the fuel valve is extended and has threaded thereto an adjustable nut 210 which determines the position of a spool-shaped collar 210. The collar is adapted to be engaged by the yoke-shaped end 211 of the lever arm 209. When the throttle is in closed position the lever 204 will be rocked counterclockwise to the position shown and maintain the valve 193 in closed position. Opening of the throttle will not initially move the valve 193 but will permit its opening by suction. The mechanism for adjusting the position of the diaphragm is enclosed by the cover 212.

Provision is made for feeding a regulated idling mixture to the engine as will be now described. The chamber 181 communicates with a duct 213 which horizontally extends as in Figure 17 into communication with a vertical duct 214 and having included therein a metering orifice 215 controlled by the position of the valve 216. The valve 216 has a squared section 217 to center its position in the duct 214 but permitting passage of fuel therepast. A threaded stud 218 closes the lower end of the duct 214 and provides for the insertion of the valve and a controlling spring 219. The valve has a stem 220 to limit its opening movement by engaging the stud 218. The valve 216 is in thrust engagement with a depending pin 221 secured to a diaphragm 222 mounted in a screw threaded stud 223. The outside of the diaphragm is acted upon by atmospheric pressure and the inside is in communication with a chamber 224 and through a passage 225 with the duct 214. The spring 219 retains the valve in closed position, while a suction communicated to the interior of the diaphragm chamber will cause the opening movement of the valve. The feed from the duct 214 is through a lateral passage 226 as in Figure 14 into communication with a vertical passage 227, which has included therein an orifice 228 that may be adjusted by a threaded needle valve 229, having a knurled head 230 and held in position by means of the spring 231. Thus the feed of fuel through the idling passage 227 may be adjusted independently of the diaphragm control. The lower end of the idling passage 227 is in communication with a duct 232 formed in a Venturi section 233 and leading into an orifice 234 which delivers into the carbureter throat below the throttle valve. The Venturi section is formed with an annular series of perforations 235 for feeding the fuel from the idling passage into the narrowest portion of the Venturi throat. The passage 232 is also in association with the load controlling tube 236 threaded into a boss 237 of the carbureter body. When the carbureter throttle is closed, there will be a high suction communicated through the load control tube and through the idling passage 227 which will be sufficient to open the diaphragm controlled idling valve and suck fuel into the Venturi section where the fuel will be aspirated by being mixed with the air drawn through the load control tube through suitable bleed openings. The chamber into which the load controlling tube is threaded is designated 238 and has an opening extending thereto, which is partially closed by a threaded stud 239 having a bleed opening 240 formed therein. In addition to the bleed opening 240, further admission of air to the load controlling tube may be allowed by a bleed orifice 241, shown in Figure 15 as being controlled through movement of the shaft 242 of the choke valve 173. The shaft 242 has a flattened side whereby rotation thereof will cut off or open the bleed orifice 241. The bleed orifice 241 is in communication with the chamber 238 through passages 243, 244 and 245.

Figure 15 shows the choke shaft in open position but when the choke is in closed position the bleed opening 241 will be at its widest opening to allow atmospheric pressure to act on the back side of the pump and give the maximum delivery for each stroke of the pump. Tendency to overchoke as the engine speeds up is prevented since the bleed 241 does not prevent the increased suction of the engine transmitting a depression to the back side of the pump diaphragm. The bleed only allows atmospheric pressure to act at low engine speeds.

Figure 21 shows a side elevation partially diagrammatic, illustrating the association with a carburetor of the type described in Figures 13 to 20 of a fuel pump similar to that illustrated in Figures 1 to 3 together with an internal combustion engine. In this figure I show a fuel fuel pump 250, having connected thereto a suction feed line 251, from a fuel tank 252. The pump delivers through a pipe line 253 to the carburetor generally designated 254. The carburetor is of the downdraft type and delivers the fuel mixture to an intake manifold 255 of the engine 256. A throttle lever is shown at 257 while 258 is an operating lever for the choke valve. Immediately above the choke valve is positioned an air cleaner 259.

The back side of the pump is connected by a pressure communicating tube 253ᵃ to the lower part of the carbureter below the throttle.

In the diagram the fuel tank is shown at a lower level than the fuel pump which is the customary arrangement but it will be readily understood that the level of the fuel in the source of supply may be above the level of the pump. The strength of the spring which controls the inlet valve to the pump is such as to resist the feeding of fuel into the pump by gravity, except upon a suction stroke of the pump.

The arrangement as described with reference to Figure 21 is a preferred construction in that no change is required in the intake manifold as the load control tube is connected directly to a portion of the carbureter below the throttle valve. However if it should be desired to associate a fuel pump with a standard carbureter and to use a load control tube, an arrangement such as shown in Figure 22 may be provided. In this figure 260 is a standard form of carbureter which has connected thereto a delivery line 253 from a fuel pump 250 similar to the arrangement as in Figure 21. The intake manifold 255, however, has a separate connection for the load control tube 253ª and this connection is shown in section in Figure 23.

As shown in Figure 23 the load control connection comprises a casting 261 which constitutes a substantially vertically arranged tubular member and has extending from the rear side thereof a threaded boss 262 through which it is connected to the intake manifold. The boss 262 has an opening 263 which extends into communication with the inner chamber 264. On the front side of the casting is provided an internally threaded boss 265 adapted to be connected to the load control tube 253ª. The bottom of the casting has a bleed opening 266 which is partially covered by a cap 267. Air may be admitted around the edges of the cap 267 to flow through the bleed opening 266 and into the inner chamber 264. A valve stem 268 which carries at its lower end a conical valve 269 is arranged to vary the effective size of the bleed opening. The upper end of the valve stem 268 is guided by the stud 270 which is threaded into the upper end of the casting. The lower end of the valve stem is guided through means of the ring 271 which is formed with suitable depressions in its edge to permit air to flow therepast. The valve is normally retained in closed position through means of a coiled spring 272 which is enclosed within the casting and presses at one end against the ring 271 and at its other end against the stud 270. The upper end of the valve stem 268 which extends outside of the casting is connected to a control rod 273 which extends to a choke lever 274. The throttle control lever is shown at 275. It will be apparent that a closing movement of the choke valve will serve to move the valve 269 upwardly and thus bleed air into the load control tube. Therefore the back side of the pump diaphragm is acted upon by substantially atmospheric pressure when the choke valve is closed while the engine is running at low speeds but it will be understood that tendency to overchoke is prevented as the engine speeds up by the building up of a depression on the back side of the pump diaphragm even though the bleed opening 266 is at its widest opening.

The details of the arrangement in Figure 22 are illustrated in a diagrammatic manner in Figure 24 from which it will be apparent that fuel delivery line 276 delivers to the top of a float chamber 277 which has positioned therein a float 278 arranged to operate a controlling inlet valve 279. Fuel from the float chamber is delivered through a tube 280 which has a submerged metering orifice 281 and which extends to a delivery orifice 282 positioned in the Venturi section 283 of the throat of a downcraft carburetor 284. The carburetor has a lower throttle valve 285 and an upper choke valve 286. Movement of the choke valve through a rod 287 operates the bleed valve 288 which is positioned in association with the load control tube 289.

This type of carbureter usually embodies some form of means for delivering an accelerating charge and such means may comprise an accelerating chamber 290 which is connected through a tube 291 to the float chamber. The tube 291 has a restricted orifice 292. At the upper end of the accelerating chamber is provided a cup-shaped plunger 293 pressed downward by a coiled spring 294. The position of the cup-shaped plunger 293 at its upper position is determined by an adjustable stop member 295 which threads into the cover 296 of the accelerating chamber. A tube 297 communicates with the accelerating chamber above the plunger 293 and extends into the lower portion of the carbureter throat below the throttle valve. Therefore with the throttle in closed position the suction on the engine will act through the tube 297 to move the plunger 293 upward against the resistance of the spring and hold it in readiness for an accelerating feed stroke. The plunger 293 is limited in its downward movement by a shoulder 298 formed in the accelerating chamber.

At the lower portion of the accelerating chamber is provided a second cup-shaped plunger 299 oppositely disposed with respect to the cup-shaped plunger 293. The plunger 299 is upwardly urged through the action of a coiled spring 300, retained in position by the cap member 301. The cup-shaped member 299 when in normal position covers the opening through which an accelerating feed tube 302 connects to the accelerating chamber. The feed tube 302 extends into the carbureter throat adjacent the main feed nozzle and has an orifice 303. With the parts in the position shown the plunger 293 is in raised position since the throttle is closed, and opening of the throttle will immediately allow substantially atmospheric pressure to be admitted through the tube 297 and thereby allow the force of the spring 294 to move the plunger 293 downward. The accelerating chamber which is below the normal level in the float chamber will be filled with fuel between the pair of opposed plungers.

Due to the provision of the restricted orifice 292 in the line which leads from the float chamber to the accelerating chamber or, if desirable, through the provision of a check valve in the line, the downward movement of the plunger 293 will not deliver the fuel from the accelerating chamber back into the float chamber but instead will cause the lower plunger 299 to move downwardly, thus uncovering the port which leads into the accelerating feed line 302. Therefore an accelerating charge will be directly delivered to the intake throat of the carbureter substantially instantaneously as the throttle is opened. The plunger 299 will be returned to its normal position through leakage of the fuel back into the float chamber through the orifice 292 and upon closing the throttle again the depression acting through the tube 297 will move the upper plunger 293 back to its original position, thus sucking in additional fuel for the next acceleration charge.

When a carbureter of this type is embodied in association with a fuel pump the float must have sufficient buoyant effect to provide the shut off pressure by closing the inlet valve which will be sufficient to prevent the pump from delivering should the level in the float chamber rise to a sufficient extent. While the engine is operated at high speeds the level of the float chamber will be low. As the throttle is closed the level of the float chamber must rise sufficiently to shut off the delivery of fuel from the fuel pump into the float chamber resulting in wide variations between the high and low levels and there is great danger of spill-over. The load control tube acting on the back side of the pump diaphragm makes it possible to maintain the variation in the float chamber level between narrow limits. Thus, upon the closing of the throttle a depression will be built up acting through the load control tube which tends to oppose the action of the pump feed spring and tends to cut down the delivery of fuel. Therefore the float operates at a substantially low shut off pressure and a stronger effective feed spring may be used than ordinarily possible.

Normally atmospheric pressure acts upon the air being fed, upon the fuel in the float chamber and upon the back-side of the pump diaphragm, if a fuel pump is used. Superchargers have been used for developing an increased pressure on the air fed for greater volumetric efficiency and having means for balancing said pressure with the pressure upon the fuel in a closed float chamber and further such pressure has been utilized by being transmitted to the backside of the pump diaphragm but in these previous systems delivery of the fuel by the pump is not varied by the load upon the engine or by pressures in the intake manifold. It is, however, to be understood that the system of the present invention can be utilized with a supercharged engine to obtain the advantages set forth in the objects of the present invention.

I claim:

1. In combination with an internal combustion engine, a carburetor in communication with the intake manifold, a choke valve associated with the carburetor, means for delivering an increased supply of fuel to the carburetor when the choke valve is in closed position and means for preventing a tendency to over-choke as the engine speeds up by cutting down the delivery of fuel so as to maintain a substantially constant ratio of fuel to air.

2. In combination with an internal combustion engine, a carburetor in communication with the intake manifold, a choke valve associated with the carburetor, a fuel pump for delivering fuel to the carburetor during the operation of the engine, a controlling tube for transmitting pressure conditions in the intake manifold to the pump for controlling the delivery thereof, a bleed valve controlled by the position of the choke valve and arranged to permit atmospheric pressure to act in the controlling tube when the choke valve is in closed position and at low engine speeds the maximum opening of the bleed valve being so proportioned that the pressure in the controlling tube is lowered as the engine speeds up thereby preventing a tendency to overchoke.

3. In combination with an internal combustion engine, a carburetor in communication with the intake manifold of the engine, a choke valve associated with said carburetor, a fuel pump for delivering fuel to said carburetor and means for increasing the delivery of fuel by said pump by a closing movement of said choke valve at the different engine speeds.

4. In combination with an internal combustion engine a carburetor in communication with the intake manifold of the engine, a throttle valve and a choke valve associated with said carburetor, a fuel pump for delivering fuel to said carburetor and means for controlling said pump by the movement of either valve at the different engine speeds.

5. In combination with an internal combustion engine, a carburetor in communication with the intake manifold of the engine, a throttle valve associated with said carburetor for controlling the mixture flow to said intake manifold, a choke valve for controlling the air supply to said carburetor, a fuel pump for delivering fuel to said carburetor, means for increasing the delivery of fuel by said pump by the opening of said throttle and means for increasing the delivery of fuel by said pump by the closing of said choke valve at the different engine speeds.

6. In combination with an internal combustion engine, a carburetor in communication with the intake manifold, a choke valve for controlling the air supply to said carburetor, a fuel pump for delivering fuel to said carburetor, means comprising a pressure tube communicating between the intake manifold and said pump to control the delivery of fuel by said pump and means for bleeding air into said tube controlled by movement of said choke valve.

7. In combination with an internal combustion engine, a carburetor in communication with the intake manifold, a choke valve for controlling the air supply to said carburetor, a fuel pump for delivering fuel to said carburetor, means comprising a pressure tube communicating between said intake manifold and said pump for controlling the delivery of fuel by said pump, means for bleeding air into said pressure tube and additional means for bleeding air into said pressure tube controlled by the movement of said choke valve.

8. In combination with an internal combustion engine, a carburetor in communication with an intake manifold, said carburetor including a choke valve, a throttle valve and a float chamber, a fuel pump having a spring for delivering fuel to said float chamber, and means for controlling the force of the delivery of fuel by said pump spring by movement of said choke valve.

9. Fuel feeding apparatus comprising in combination a variable stroke fuel pump and an internal combustion engine, said pump being arranged to deliver fuel directly to a delivery orifice positioned in an air conduit in communication with the intake manifold of the engine, the pump including a movable pumping member and resilient means acting on the pumping member in the direction of its feeding stroke, whereby the suction of the engine acting at the delivery orifice will control the effect of said resilient means.

10. Fuel feeding apparatus comprising in combination a fuel pump, an internal combustion engine having an air conduit in communication with the intake manifold, connections to the pump from a fuel tank and delivery connections from the fuel pump to the air conduit, said pump having constant pressure means acting in the direction of the delivery stroke of the pump, said constant pressure means being arranged to be controlled by the suction of the engine acting at the delivery orifice to increase the delivery of fuel by said pump in accordance with the increase in engine suction and further means controlled by the engine suction with an opposite effect whereby an increase in the engine suction will tend to cut down the delivery of fuel by said pump.

11. Fuel feeding apparatus comprising in combination a fuel pump, an internal combustion engine having an air conduit in communication with the intake manifold, a throttle valve and a choke valve positioned in the air conduit, delivery connections from said pump to a delivery orifice positioned in the air conduit intermediate said choke and throttle valves and a pressure communicating connection between said pump and the intake manifold on the engine side of the throttle, whereby an increase in the depression acting at the delivery orifice will increase the delivery of fuel by said pump and an increase in the depression beyond said throttle will decrease the delivery of fuel by said pump.

12. Fuel feeding apparatus comprising in combination a fuel pump including a movable pumping member acted upon by resilient constant pressure means for discharge of fuel, an internal combustion engine having an air conduit in communication with the intake manifold, delivery connections from the pump to a delivery orifice in the air conduit intermediate the choke and throttle valves, and a controlling tube communicating between said pump and the intake manifold beyond the engine throttle whereby depressions in engine suction communicated through said tube will cut down the delivery of fuel of said pump.

13. Fluid feeding apparatus comprising a pump, a movable pumping member in said pump communicating on one side with a pumping chamber, inlet and outlet connections to the pumping chamber, reciprocal means acting on the pump to produce pulsations of the pumping member and having a lost motion connection thereto, resilient means for imparting a feeding stroke to the pumping member upon operation of the reciprocal means, means for developing pressure acting in opposition to the resilient means on the side of the pumping member opposite to the pumping chamber whereby the effective strength of the resilient means is modified and the fluid delivery controlled.

14. Fluid feeding apparatus comprising a pump, a movable pumping member in said pump communicating on one side with a fluid chamber, inlet and exit connections from the fluid chamber, reciprocal means acting on the pump to permit pulsations of the pumping member and having a lost motion connection thereto, resilient means for imparting a feeding stroke to the pumping member upon operation of the reciprocal means, means for developing pressure acting in opposition to the resilient means on the side of the pumping member opposite to the fluid chamber whereby the effective strength of the resilient means is modified and the fluid delivery controlled, said last named means comprising a controlling tube leading from a source of varying pressures to a chamber on the side of the movable pumping member opposite to the fluid chamber.

15. Fluid feeding apparatus comprising a pump, said pump including a casing, a movable diaphragm dividing the casing into two chambers, one of said chambers comprising a fluid pumping chamber and the other of said chambers comprising a pressure chamber, reciprocal means having a lost motion connection to the movable diaphragm whereby actuation thereof will permit movement of the diaphragm, resilient means acting on the movable diaphragm in the direction of a feeding stroke, means communicating with the pressure chamber from a source of varying pressures different from the pressure at the delivery of the pump whereby the pressures developed in the pressure chamber will increase or decrease the effective strength of the resilient means and control the delivery of the fluid.

16. Fluid feeding apparatus comprising a pump, said pump including a casing, a movable diaphragm dividing the casing into two chambers, one of said chambers comprising a fluid pumping chamber and the other of said chambers comprising a pressure chamber, reciprocal means having a lost motion connection to the movable diaphragm whereby actuation thereof will permit movement of the diaphragm, resilient means acting on the movable diaphragm in the direction of a feeding stroke, means communicating with the pressure chamber from a source of varying pressures different from the pressure at the delivery of the pump whereby the pressures developed in the pressure chamber will increase or decrease the effective strength of the resilient means and control the delivery of the fluid, said reciprocal means being actuated from a member that rotates at varying speeds.

17. Fluid feeding apparatus comprising a pump arranged to lift fluid from a source of supply and deliver fluid at a constant height, said pump including a pulsating diaphragm, resilient means continuously acting on the pulsating diaphragm in the direction of its feeding stroke, reciprocal means having a lost motion connection to the pulsating diaphragm whereby actuation thereof will permit movement of the pulsating diaphragm for the feeding stroke by the action of said resilient means, the height of the fluid column between the pump and the point of delivery when subjected to atmospheric pressure at the point of delivery being sufficient to oppose the force of the resilient means and permit only an idle flow and means for producing sub-atmospheric pressures at the point of delivery to control the flow of the fluid.

18. Fluid feeding apparatus comprising a pump arranged to lift fluid from a source of supply and deliver fluid at a constant height, said pump including a pulsating diaphragm, resilient means continuously acting on the pulsating diaphragm in the direction of its feeding stroke, reciprocal means having a lost motion connection to the pulsating diaphragm whereby actuation thereof will permit movement of the pulsating diaphragm for the feeding stroke by the action of said resilient means, the height of the fluid column between the pump and the point of delivery when subjected to atmospheric pressure at the point of delivery being sufficient to oppose the force of the resilient means and permit only an idle flow, means for producing sub-atmospheric pressures at the point of delivery to control the flow of the fluid and means for developing additional pressure acting on the side of the diaphragm opposite to that in association with the fluid to modify the effective strength of the resilient means and further control the flow of the fluid.

19. Fluid feeding apparatus comprising a pump, a movable pumping member in said pump, a fluid chamber on one side of the pumping member and a pressure chamber on the other side of the pumping member, a feed spring in the pressure chamber arranged to continuously urge the pumping member in the direction of its feeding stroke, reciprocal means operable in one direction to impart an intake stroke to the pumping member and in the other direction to allow movement of the pumping member by the resilient means for the feeding stroke and means for exhausting air from the pressure chamber to oppose the action of the feed spring and control the delivery of fluid by the pump.

20. In combination with an internal combustion engine, a carbureter and a pulsating diaphragm fuel pump, a fuel delivery line leading from the pump chamber to the mixture chamber of the carbureter, an intake manifold to deliver the fuel mixture from the carbureter to the engine, a throttle in the intake manifold and a pressure tube communicating between the intake manifold on the engine side of the throttle and the back side of the pump diaphragm.

21. Apparatus for controlling the delivery of fuel to an internal combustion engine comprising a fuel pump arranged to deliver fuel to a nozzle positioned in the air conduit of a carbureter, the pump comprising a movable pumping member resiliently urged in the direction of its feed stroke, reciprocal means for moving the pumping member having lost motion connection thereto, the height of fuel between the fuel nozzle and the pump being sufficient to oppose the force of the resilient means when atmospheric pressure is acting on the fuel nozzle and permit only an idle flow, whereby the depression produced at the fuel nozzle due to the flow of air through the carbureter will control the delivery of fuel.

22. Apparatus for controlling the delivery of fuel to an internal combustion engine comprising a fuel pump arranged to deliver fuel to a nozzle positioned in the air conduit of a carbureter, the pump comprising a movable pumping member resiliently urged in the direction of its feed stroke, reciprocal means for moving the pumping member having lost motion connection thereto, the height of fuel between the fuel nozzle and the pump being sufficient to balance the force of the resilient means when atmospheric pressure is acting on the fuel nozzle, whereby the depression produced at the fuel nozzle due to the flow of air through the carbureter will produce and control the delivery of fuel, additional controlling means for the pump comprising means for varying the effective strength of the resilient means in accordance with pressure conditions in the intake manifold on the engine side of the throttle.

23. Apparatus for supplying fuel to an internal combustion engine comprising a carbureter having an air conduit in communication with the intake manifold of the engine, a throttle in the intake manifold, means for impelling fuel by a pre-determined pressure for discharge in the air supply conduit, means for opposing the predetermined pressure means by engine suction consisting of a duct leading from beyond the engine throttle to the rear side of the fuel impelling element and means for regulating the communication of suction through said duct consisting of an adjustable air bleed into the duct.

24. Apparatus for supplying fuel to an internal combustion engine having an intake manifold in communicating with the mixture chamber of a carbureter having an air conduit, a throttle on the engine side of the mixture chamber and a choke valve in the air conduit, an adjustable fuel delivery orifice within the mixture chamber, resilient means for developing pressure to feed fuel to the delivery orifice and means for varying the effective strength of the resilient means, including a duct communicating with an orifice in the intake manifold on the engine side of the throttle.

25. Apparatus for supplying fuel to an internal combustion engine having an intake manifold in communication with the mixture chamber of a carbureter having an air conduit, a throttle on the engine side of the mixture chamber and a choke valve in the air conduit, an adjustable fuel delivery orifice within the mixture chamber, resilient means for developing pressure to feed fuel to the delivery orifice and means for varying the effective strength of the resilient means, including a duct communicating with an orifice in the intake manifold on the engine side of the throttle and adjustable means for varying the flow of air through said duct.

26. Apparatus for supplying fuel to an internal combustion engine having an intake manifold in communication with the mixture chamber of a carbureter having an air conduit, a throttle in the engine side of the mixture chamber and a choke valve in the air conduit, an adjustable fuel delivery orifice within the mixture chamber, resilient means for developing pressure to feed fuel to the delivery orifice and means for varying the effective strength of the resilient means, including a duct communicating with an orifice in the intake manifold on the engine side of the throttle, adjustable means for varying the flow of air through said duct and additional adjusting means for varying the flow of air through said duct comprising an air bleed in communication with the duct.

27. In combination with an internal combustion engine having a choke valve in the air supply conduit antecedent to the fuel discharge thereinto, means for delivering fuel to the point of fuel discharge at a pre-determined pressure according to the suction produced at the point of fuel discharge and means for varying said pressure by engine suction derived from the intake manifold beyond the throttle comprising a duct communicating with the fuel delivery means, means for regulating the flow through said duct consisting of an air bleed for admitting atmosphere into the duct and means for adjusting said air bleed through movement of the choke valve.

28. In combination with an internal combustion engine an intake manifold, a carburetor associated with the intake manifold having an air intake and a fuel delivery orifice positioned in the air intake, fuel pumping means comprising a pulsating diaphragm moved through the force of a compression feed spring for delivering fuel to the fuel delivery orifice at a compensating pressure head to maintain a substantially uniform air to fuel ratio during variations in engine speeds.

29. In combination with an internal combustion engine having an intake manifold, a carbureter associated with the intake manifold having an air intake, a fuel delivery orifice positioned in the air intake, a source of fuel supply, fuel pumping means for delivering fuel from the source of fuel supply to the fuel delivery orifice, said fuel pumping means including means to deliver fuel at a compensating pressure whereby to maintain a substantially uniform air to fuel ratio during variations in engine speeds unaffected by variations in level of the fuel supply.

30. In combination with an internal combustion engine having an intake manifold, a carbureter associated with the intake manifold, having an air intake and a fuel delivery orifice positioned in the air intake, a throttle valve controlling the flow of fuel, pumping means for delivering fuel from a source of fuel supply to the fuel delivery orifice, comprising a movable pumping member, resilient means acting upon said fuel pumping member to deliver fuel at a compensating pressure head to the fuel delivery orifice whereby to maintain a substantially uniform air to fuel ratio during variations in engine speeds and means for controlling the fuel pumping means by pressure conditions in the intake manifold on the engine side of the throttle.

31. In a fuel feed system for an internal combustion engine, a floatless carbureter for delivering the fuel mixture to the intake manifold of the engine, a low level source of fuel supply, a pumping device for lifting the fuel from the low level source of fuel supply for delivery to the carbureter, means for operating said pumping device to produce suction for lifting the fuel to the pumping device and means for increasing the delivery of fuel from said pumping device to said carbureter in accordance with an increase in depression acting at the delivery orifice within said carbureter.

32. In a fuel feed system for internal combustion engines, a floatless carbureter for delivering the fuel mixture to the intake manifold of the engine, a low level source of fuel supply, a pumping device directly connected with the low level source of fuel supply and a delivery orifice within the carbureter, said pumping device including a reciprocable pumping diaphragm, means having a lost motion connection with said diaphragm for producing the suction strokes of said diaphragm and means for producing variable delivery strokes of said diaphragm in accordance with the reduction in pressure existing at the fuel delivery orifice within said carbureter.

33. In combination with an internal combustion engine, a carbureter in communication with the intake manifold of the engine, a throttle valve controlling the flow of the fuel mixture from the carbureter to the intake manifold, a fuel pump for delivering fuel to said carbureter including means for operating said pump for intake of fuel and means for controlling the amount of fuel delivered thereby, said last-named means comprising a pressure responsive pumping device operative for delivery of fuel to the carbureter by the resultant of the pressures on the opposite sides thereof, the pressure on one side being the variable pressure of the fuel being fed and the pressure on the other side being derived from the intake manifold on the engine side of the throttle.

34. In combination with an internal combustion engine, a carbureter in communication with the intake manifold of the engine, a throttle valve controlling the flow of the fuel mixture from the carbureter to the intake manifold, a fuel pump for delivering fuel to said carbureter including means for operating the pump for intake and means for controlling the amount of fuel delivered thereby, said last-named means comprising a pressure responsive pumping device operative for delivery by the resultant of the pressures on the opposite sides thereof, the pressure on one side being the variable pressure of the fuel being fed and the pressure on the other side being the atmospheric pressure as modified by the pressure in the intake manifold on the engine side of the throttle valve.

35. In combination with an internal combustion engine, a carbureter in communication with the intake manifold of the engine, a throttle valve controlling the flow of the fuel mixture from the carbureter to the intake manifold, a fuel pump for delivering fuel to said carbureter, means for actuating said pump in accordance with the speed of the engine and means for controlling the delivery of said pump independently of a change in speed of the engine, said last-named means comprising a pressure responsive pumping diaphragm exposed on one side to the variable pressure of the fuel being fed and exposed on the other side to a constant pressure resilient means and a variable sub-atmospheric pressure derived from the intake manifold on the engine side of the throttle valve.

36. In combination, means for supplying a body of fuel under pressure to an internal combustion engine involving the production of a vacuum, means for varying the pressure of the fuel fed, through the agency of said vacuum, and a device for adjusting the last mentioned means.

37. In combination, means for supplying a body of fuel under pressure to an internal combustion engine involving the production of a vacuum, means for varying the pressure of the fuel fed, through the agency of said vacuum, and a device for manually adjusting the last-mentioned means.

38. In combination, a source of fuel under pressure, a source of a different pressure for controlling the supply of the fuel under pressure, said source of different pressure having a valve for controlling the effect thereof upon the pressure-fed fuel.

EDWARD A. ROCKWELL.